UNITED STATES PATENT OFFICE.

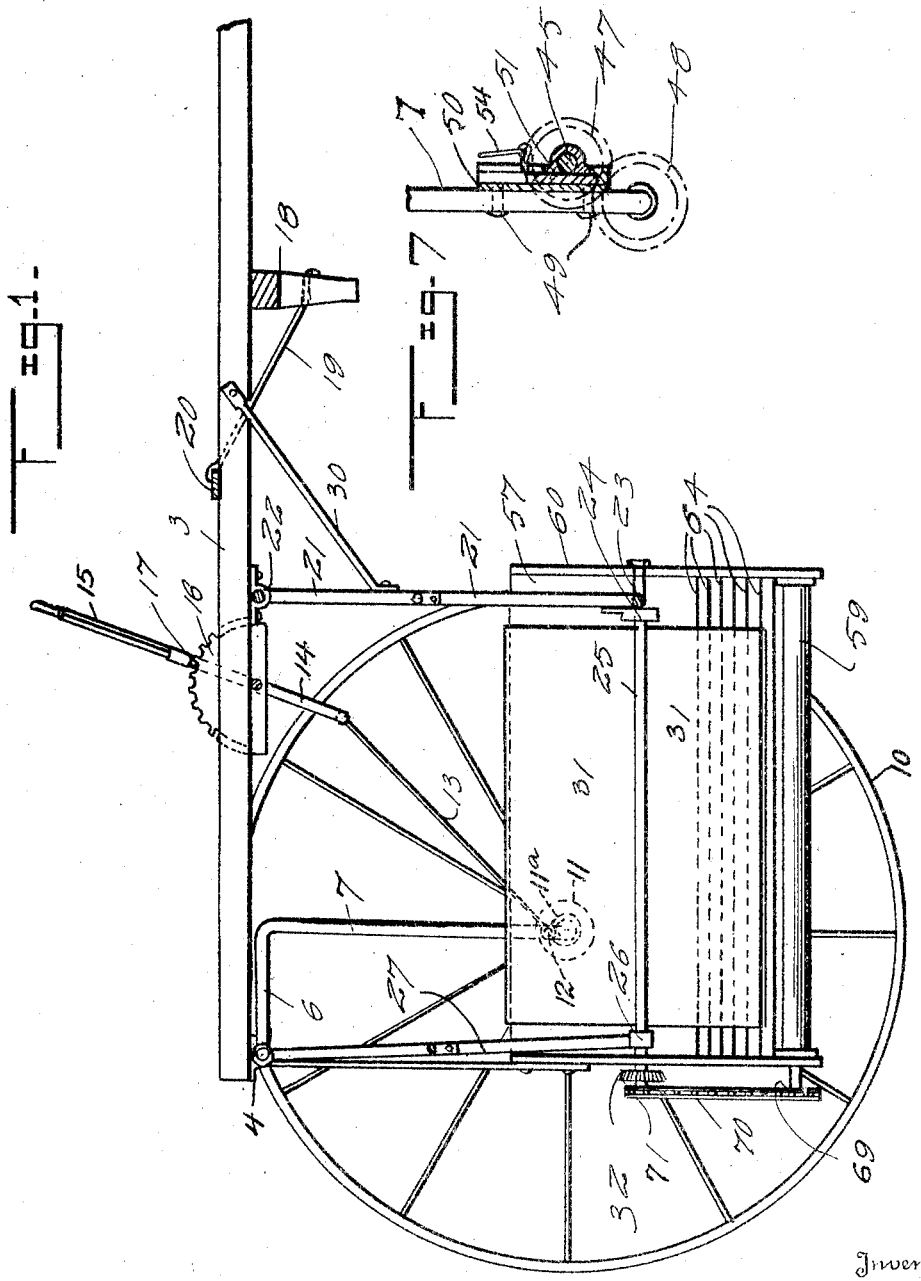

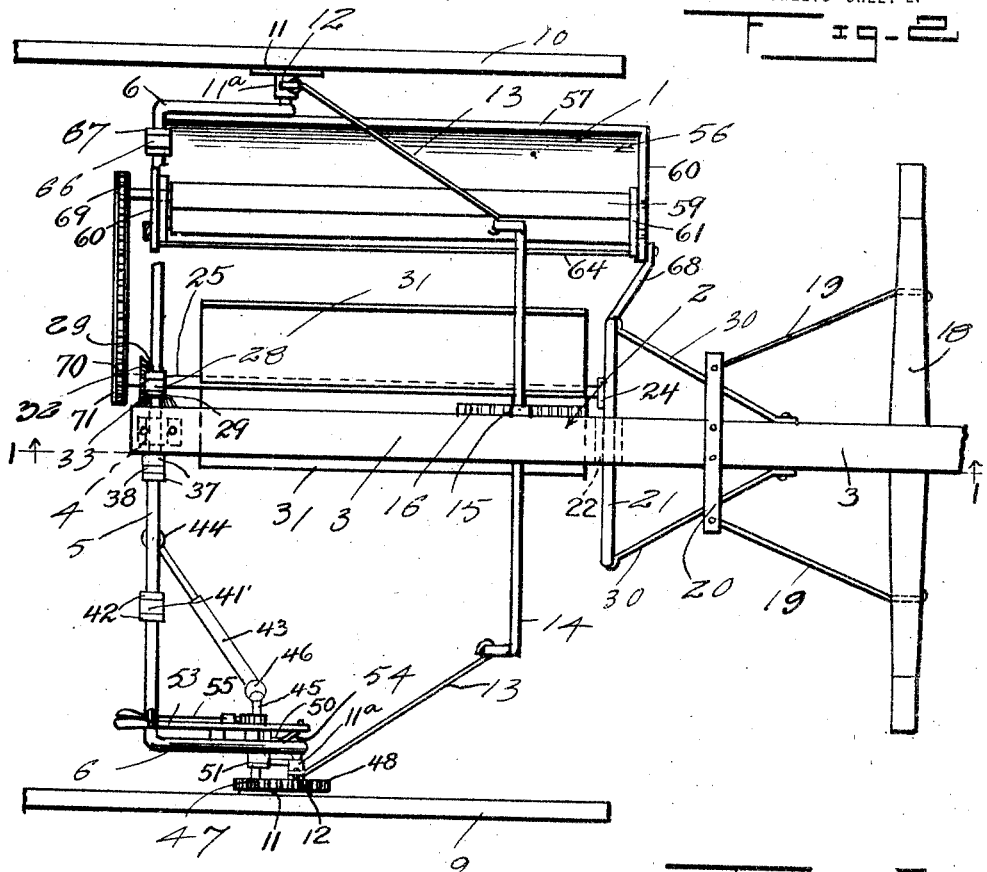
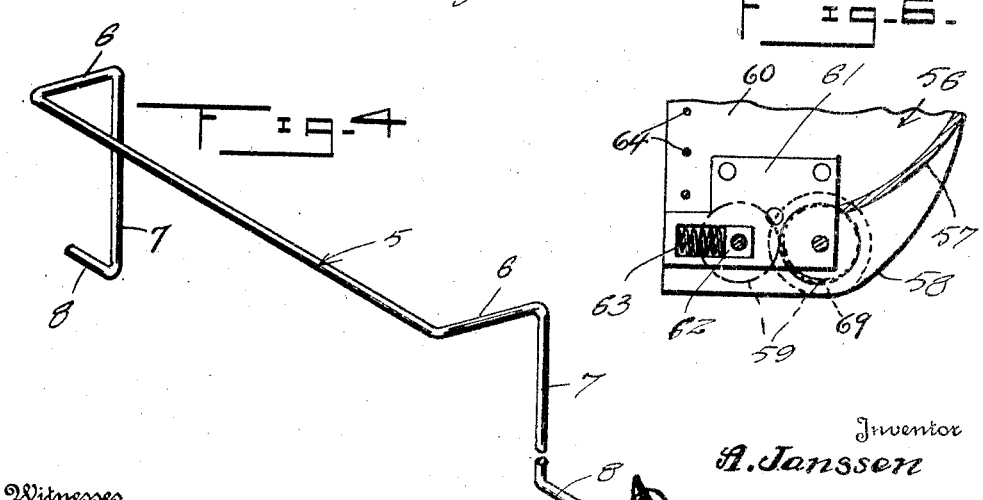

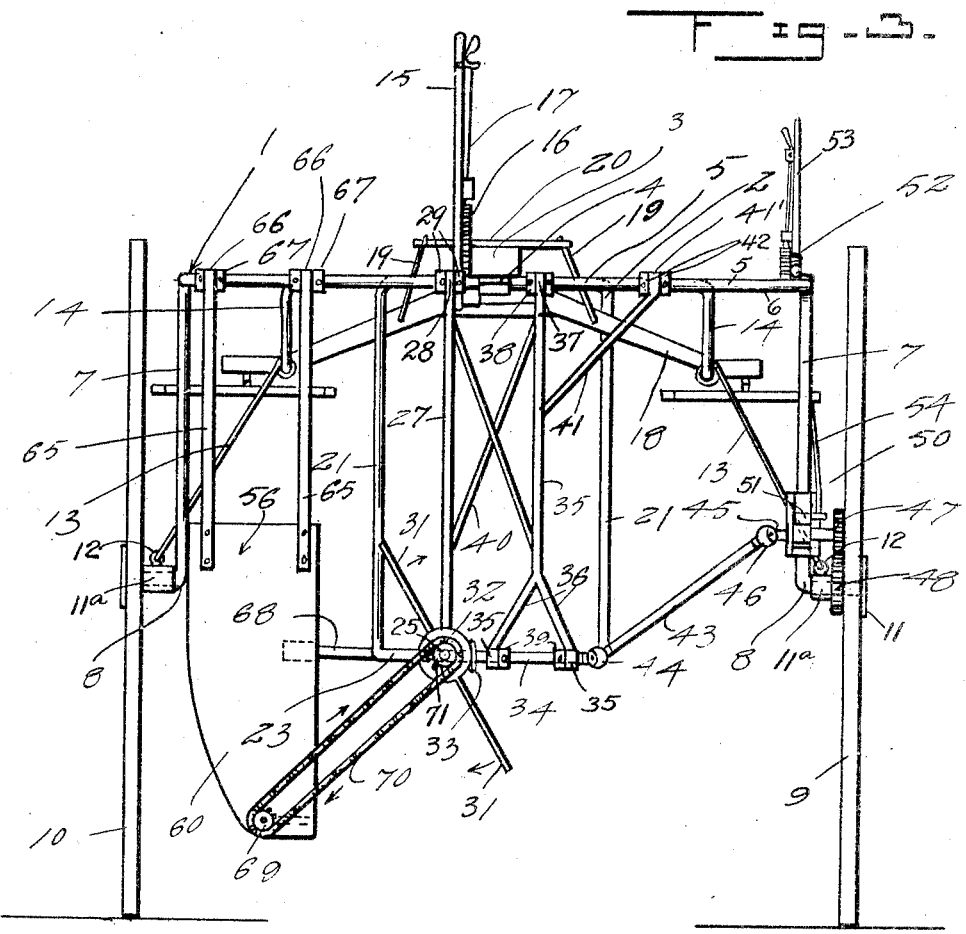
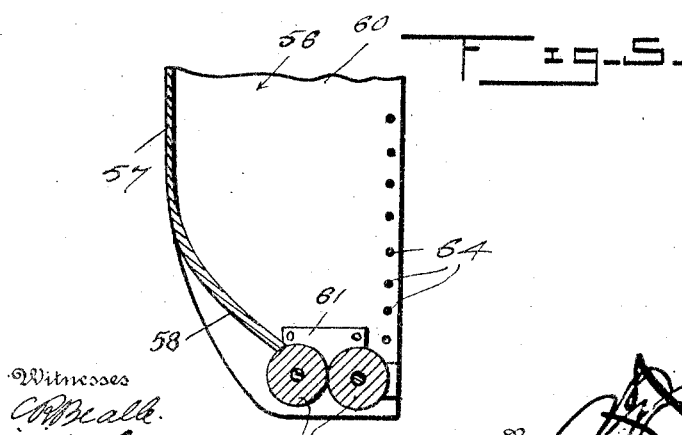

ALBERT JANSSEN, OF SIBLEY, IOWA.

POTATO-BUG-KILLING MACHINE.

1,334,863.  Specification of Letters Patent.  Patented Mar. 23, 1920.

Application filed August 29, 1917. Serial No. 188,779.

*To all whom it may concern:*

Be it known that I, ALBERT JANSSEN, a citizen of the United States, residing at Sibley, in the county of Osceola and State of Iowa, have invented certain new and useful Improvements in Potato-Bug-Killing Machines; and I do hereby declare the following to be a full, clear, and exact description of the invention, such as will enable others skilled in the art to which it appertains to make and use the same.

This invention relates to a device for knocking insects off of plants and more particularly to a machine for knocking potato bugs off of growing potato vines and the primary object of the invention is the provision of a machine for knocking the bugs off of the vines and into a receptacle provided for that purpose.

Another object of the invention is the provision of a wheeled frame having a beater or fan rotatably mounted upon the frame and operatively connected to one of the wheels of the frame for hitting the vines and a stationary receptacle secured to the frame for receiving the bugs.

A further object of the invention is the provision of a pair of rollers mounted in the receptacle and operatively connected to the beater for mashing the bugs after the same have been knocked into the receptacle.

A still further object of the invention is the provision of an improved method for throwing the beater and rollers into and out of operative engagement with the wheels of the vehicle so that the machine can be operated when desired.

A still further object of the invention is the provision of means for lowering or raising the wheels in relation to the frame of the vehicle, so that the beater carried by the frame can be adjusted for high or low vines, and thus efficiently operate with all kinds of plants.

A still further object of the invention is to provide a machine of the above character, which is durable and efficient in use, one that is simple and easy to manufacture, and one that can be placed upon the market at a reasonable price.

With these and other objects in view, the invention consists in the noval construction, arrangement and formation of parts, as will be hereinafter more specifically described and claimed, and illustrated in the accompanying drawings forming a part thereof, in which:—

Figure 1 is a side elevation in broken section of the improved potato bug gathering and killing machine taken substantially on line 1—1 of Fig. 2.

Fig. 2 is a top plan view of the same, with the clutch lever in idle position.

Fig. 3 is a rear elevation of the machine, showing the gear wheel in driving position.

Fig. 4 is a detail perspective view of the axle supporting the wheels.

Fig. 5 is a detail section taken through the receptacle for receiving the bugs near the rearward end in Fig. 1 and the masher rollers looking toward the other end.

Fig. 6 is a fragmentary elevation of the receptacle showing the manner of mounting the rollers in the receptacle, and Fig. 7 is a detail fragmentary view illustrating the manner of throwing the beater in and out of gear with the wheels of the vehicle.

Referring to the drawings in detail, wherein similar reference numerals designate corresponding parts throughout the several views, the numeral 1 generally indicates the improved potato bug gathering and killing machine, which includes a frame 2. The frame 2 includes a beam or tongue 3, which extends the whole length of the machine and has pivotally secured thereto in a suitable bearing bracket 4, the axle 5. The axle 5 is bent to form the U-shaped member 6, which has its free end bent downwardly to provide the vertically disposed supporting legs 7 which in turn have their free end directed outwardly in opposite directions as at 8 to receive the supporting wheels 9 and 10 respectively. The inner faces of the hubs 11 of the wheels 9 and 10 are each in contact with a collar 11ª which is loosely mounted on element 8 and is provided with an eye 12, which pivotally receives one end of the connecting link 13. The opposite ends of each one of the connecting links are pivotally secured to the free end of a horizontally disposed rod 14, which extends across the machine 1 and is secured through the lower end of the adjusting lever 15, which is rockably mounted by means of rod 14 on a ratchet segment 16 secured to one side of tongue 3. The adjusting lever 15 carries a detent 17 for engaging the ratchet segment 16 and by moving the lever the lower ends of the axle 5 can be swung up or down in relation to the machine and thus the wheels 9 and 10 can be positioned in any desired relation to the tongue 3.

A double tree 18 or other suitable draft attaching means is secured to the tongue or beam 3 by suitable braces 19 fastened to a cross rod 20 rigidly secured to the beam and thus the machine can be hitched to a team and drawn across a field.

A substantially U-shaped frame 21 is mounted at the center of its bight portion in a bracket 22 secured to the under side of beam 3 and the U-shaped frame is positioned in spaced parallel relation to the axle 5. The lower end of the legs of the U-shaped frame 21 are connected by a cross bar 23 which supports a suitable bearing 24 which rotatably supports one end of a shaft 25. The opposite end of the shaft 25 is rotatably supported in a bearing 26 carried by the free lower end of a depending rod 27 carried by the axle 5. The upper end of the rod 27 carries an eye 28, which is loosely mounted on the axle 5 and suitable collars 29 carrying set screws are positioned on the axle and abutting each end of the eye and hold the rod in place. Suitable brace rods 30 extend from the beam 3 to the U-shaped frame 21 and hold the same rigidly in position. A pair of blades 31 are mounted diametrically opposite each other on the shaft 25 by suitable brackets and these blades form a suitable beater when the shaft 25 is rotated to knock the bugs out of the potato vines.

A bevel gear 32 is secured adjacent the rear end of the shaft 25 and meshes with a bevel gear 33 carried by the inner end of a shaft 34 which is rotatably mounted in a pair of bearings 35 carried by a depending rod 35' which is loosely carried on the axle 5. The lower end of the depending rod 35' is bifurcated and the ends are bent to form the V-shaped members 36 which carry the bearings 35. The upper end of the rod has a bearing 37 which is loosely mounted on the axle 5 and collars 38 carrying set screws are positioned on each side of the bearing and prevent the displacement of the same on the axle. Suitable collars 39 carrying set screws bear against the inner sides of the bearings 35 and hold the rod 35' against movement on the shaft. Suitable cross braces 40 extend from the rod 27 to the rod 35' so as to form a rigid construction. A diagonal brace 41 extends from the rod 35' upwardly to the axle and a bearing 41' is carried by the upper end of the rod and receives the axle, and suitable collars 42 are mounted on each side of the bearing 41' and prevent movement of the bearing 41 relatively to the axle. An inclined telescopic shaft 43 is connected to the shaft 34 by a universal joint 44 and the upper end of this shaft is connected to a relatively short shaft 45 by a universal joint 46. The outer end of the relatively short shaft 45 carries a gear 47 which meshes with a gear 48 rigidly secured to the hub 11 of the wheel 9. Thus it will be seen upon rotation of the wheel 9, the beater will be rotated. A guide way 50 is secured to the downwardly extending leg 7 of the axle 5 adjacent to the wheel 9 by suitable bolts or rivets 49 and slidably mounted in the guide way is a bearing sleeve 51. The bearing sleeve 51 rotatably supports the relatively small shaft 45 held against lateral movement in relation to the bearing by suitable collars keyed to the shaft. A segmental rack 52 is secured to one of the arms of the U-shaped member 6 of the axle 5 adjacent the wheel 9 by suitable bolts or other fastening elements and a lever 53 is rotatably carried by the segmental rack and a suitable connecting link or cable 54 is carried by the lower end of the lever 53 and is secured to the bearing sleeve 51. A sliding dog 55 is carried by the lever 53 and serves to lock the lever in any set position. By moving the lever, the bearing member 51 can be raised or lowered and thus the gear 47 moved into or out of mesh with the gear 48 carried by the wheel 9.

Positioned adjacent the wheel 10 and to one side of the blades 31 is a receptacle 56 which extends longitudinally of the vehicle and is slightly longer than the blades 31. The side of the receptacle adjacent the blades 31 is left open, so that when the blades are rotated the bugs knocked off of the potato vines will be thrown into the receptacle. The receptacle 56 includes the rear wall 57 which has its lower end curved as at 58 so as to throw or guide any bugs which hit onto the rear wall against a pair of masher rollers 59, which will be hereinafter more fully described, positioned in the bottom of the receptacle, and a pair of end walls 60. The masher rollers 59 are rotatably mounted in suitable brackets 61 carried by the end walls 60. One of the masher rollers has its bearing slidably mounted in a guide way 62. A suitable coil expansion spring 63 is positioned in the guide way 62 and bears against the bearing carried by the roller and forces the roller into frictional engagement with the other roller. A plurality of rods 64 extends from one end wall 60 to the other adjacent the inner open side of the receptacle and form a suitable guard, whereby the potato vines are prevented from being knocked into the receptacle and mashed between the rollers 59. The receptacle 56 is held in position by suitable depending brackets 65 which are secured to the rear end walls 60 of the receptacle and have their upper ends loosely carried by the axle 5 as at 66. Suitable collars 67 bear against the sides of the brackets 65 and prevent longitudinal movement of the same along the axle. A supporting bracket 68 extends from one of the arms of the front U-shaped frame 21 and holds the forward end of the receptacle in position. The outer one of the rollers 59 has its shaft extended through back plate 60 of casing 56 and is provided with a sprocket wheel 69 secured thereon, a sprocket chain 70 being passed about this sprocket wheel and over a sprocket wheel 71 secured to the rear end of the axle or shaft 25. Thus it will be seen that when the beater is rotated the rollers will rotate therewith, so that as the bugs are knocked into the receptacle the same will be mashed between the rollers 59 which are held in frictional engagement with each other by the coil springs 63.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What is claimed is:—

1. In a machine of the character described, the combination with a supporting frame including an arched supporting axle, of ground wheels rotatably mounted on said axle, a receptacle depending from said frame and adapted to receive bugs directed thereinto, a beater supported in parallel spaced relation to the receptacle, the side of the receptacle adjacent said beater being open so as to permit the beater to discharge bugs into the receptacle when rotated, a gear wheel secured to one of said ground wheels for rotation therewith, a stub shaft supported on one of the vertical arms of the arched axle so as to be movable toward and away from the gear wheel, a pinion secured on the outer end of the stub shaft so as to be moved into and out of mesh with the gear wheel when said shaft is raised or lowered, and flexible driving connections between said stub shaft and the beater whereby the beater may be rotated from the ground wheel and may be thrown into or out of operation, optionally, by adjusting the stub shaft upon the vertical arm of the supporting axle.

2. In a machine of the character described, a supporting frame including an arched supporting axle being provided at each end with a substantially vertically disposed arm, ground wheels rotatably mounted on the axle, a receptacle depending from said frame, the inner side of said receptacle being open, mashing rollers caried by the receptacle, a beater rotatably supported by the frame in parallelism with and adjacent to the inner open side of the receptacle, driving connections between one of said mashing rollers and the shaft of said beater so as to cause rotation of the rolls simultaneously with operation of the beater, a stub shaft mounted on the vertical arm at one end of the supporting axle adjacent the ground wheel carrying the driving gear wheel, said stub shaft being slidably supported for movement toward and away from the gear wheel, a pinion secured on the outer end of the stub shaft for movement into and out of mesh with the gear wheel in accordance with adjustment of said shaft, and flexible connections between the stub shaft and shaft of said beater for causing simultaneous rotation of the beater and the masher rolls when the machine is drawn forwardly along a row of plants.

3. In a machine of the character described, the combination with a supporting frame including an arched axle provided with substantially vertically disposed arms adjacent each end, of ground wheels carried by said axle and rotatably mounted thereon, a receptacle suspended from the frame and disposed longitudinally thereof, the inner side of said receptacle being open, a beater rotatably suspended from the frame in parallel spaced relation to the receptacle and adjacent the open inner side thereof, a guide member secured to one of the vertical arms of said axle, a bearing sleeve slidably supported by said guide member for vertical movement therein, the sleeve being disposed at right angles to the guide member and in parallelism with the axis of the adjacent ground wheel, a stub shaft rotatably mounted in said sleeve, a drive gear secured on the hub of the adjacent ground wheel for rotation therewith, a pinion secured on the outer end of the stub shaft and movable therewith into and out of mesh with said drive gear, and flexible driving connections between the stub shaft and the beater whereby the beater may be thrown into or out of operation by moving the bearing sleeve in proper direction so as to bring the pinion into or out of mesh with the gear.

In testimony whereof I affix my signature in presence of two witnesses.

ALBERT JANSSEN.

Witnesses:
A. F. KOOPMAN,
J. M. JANSSEN,